United States Patent
Del Prà

(10) Patent No.: US 7,255,660 B2
(45) Date of Patent: Aug. 14, 2007

(54) ACTUATOR FOR A BICYCLE GEAR-SHIFT

(75) Inventor: Giuseppe Del Prà, Zané (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 11/416,032

(22) Filed: May 2, 2006

(65) Prior Publication Data

US 2006/0199688 A1    Sep. 7, 2006

Related U.S. Application Data

(63) Continuation of application No. 10/423,312, filed on Apr. 25, 2003, now Pat. No. 7,086,974.

(51) Int. Cl.
*F16H 63/06* (2006.01)
(52) U.S. Cl. ...................................................... 474/82
(58) Field of Classification Search ................ 474/70, 474/78, 80, 81, 82, 83
See application file for complete search history.

(56) References Cited

U.S. PATENT DOCUMENTS

| | | | | |
|---|---|---|---|---|
| 5,254,044 A | * | 10/1993 | Anderson | 474/70 |
| 5,470,277 A | * | 11/1995 | Romano | 474/70 |
| 5,480,356 A | * | 1/1996 | Campagnolo | 474/70 |
| 5,494,307 A | * | 2/1996 | Anderson | 280/236 |
| 6,047,230 A | | 4/2000 | Spencer et al. | |
| 6,623,389 B1 | * | 9/2003 | Campagnolo | 474/70 |
| 6,761,655 B2 | * | 7/2004 | Fukuda | 474/70 |
| 2004/0014541 A1 | * | 1/2004 | Del Pra | 474/70 |
| 2004/0063528 A1 | * | 4/2004 | Campagnolo | 474/70 |

FOREIGN PATENT DOCUMENTS

| | | |
|---|---|---|
| DK | DE 39 38 454 | 5/1991 |
| EP | 1 103 456 | 5/2001 |

* cited by examiner

*Primary Examiner*—Vicky A. Johnson
(74) *Attorney, Agent, or Firm*—Volpe & Koenig PC (57) ABSTRACT

A bicycle gear-shift actuator having an articulated quadrilateral support with four connecting rods hinged together by four pin elements, and a motor member, having a variable length output shaft that travels along a drive axis between two opposite pin elements to move them for deforming the articulated quadrilateral. Preferably, the drive axis perfectly intersects the pin axis of at least one of the two pin elements.

32 Claims, 7 Drawing Sheets

ACTUATOR FOR A BICYCLE GEAR-SHIFT

CROSS REFERENCE TO RELATED APPLICATIONS

This application is a continuation of U.S. patent application Ser. No. 10/423,312 filed Apr. 25, 2003, now U.S. Pat. No. 7,086,974 which is incorporated by reference as if fully set forth.

FIELD OF THE INVENTION

The present invention concerns a bicycle gear-shift actuator; that is a mechanical device which causes the displacement of the chain between different sprockets or gears of a bicycle transmission.

In the context of this description, the invention applies equally to a rear gear-shift, which displaces the chain between the different sprockets associated with the rear wheel of the bicycle, or the front one, which displaces the chain between the different gears associated with the pedal cranks.

BACKGROUND

In the prior art, the actuator comprises an articulated quadrilateral mechanism (typically an articulated parallelogram) with four connecting rods hinged together according to four pin axes by four pin elements, in which the first connecting rod is integrally fixed to the bicycle frame, the second connecting rod (opposite to the first connecting rod in the articulated quadrilateral) is fixed to a support for the gear-shift derailleur; the deformation of the articulated quadrilateral determines the displacement of the derailleur and therefore the gear-change.

SUMMARY

The present invention contemplates an actuator comprising: an articulated quadrilateral mechanism with four connecting rods hinged together along to four pin axes by four pin elements, in which the first connecting rod is intended to be integrally fixed to a frame of the bicycle, the second connecting rod is opposite to the first connecting rod in the articulated quadrilateral and is intended to be fixed to a support for a gear-shift derailleur. A motor member, having a variable length shaft, acts between two opposite pin elements to move them towards and away from each other deforming the articulated quadrilateral.

The drive axis of the shaft substantially intersects the pin axis of both the two pin elements between which it is active.

BRIEF DESCRIPTION OF THE DRAWINGS

Further advantages of the invention shall become evident from the following description with reference to the attached drawings. In such drawings.

DESCRIPTION OF THE PREFERRED EMBODIMENTS

The deformation of the articulated quadrilateral can be obtained manually, through the movement of control levers transmitted to the actuator through a cable of the Bowden type, or with an electric motor which—following an appropriate command given by the cyclist and through an appropriate mechanism—displaces different parts of the articulated quadrilateral one to the another, deforming it and thus displacing the derailleur.

There is a need for improving the precision of actuation, upon which depends the ease and reliability of the gear-shift. This requirement becomes greater when the gear-shift is intended to be used in high-level cycling competition. The adoption of electric motor components makes precision actuation even greater, because the deformation action in such a case is very direct, without the mediation of the Bowden cable.

According to this invention, the deformation action substantially takes place along one of the diagonals of the articulated quadrilateral; this ensures the best conditions for controlling the deformation itself, The conditions for controlling the deformation are even better in a preferred solution in which the drive axis perfectly intersects at least one of the pin axes. In this condition, the distance between said axes becomes minimal and only comprises the typical tolerances associated with the mechanical processing.

The term "substantially intersects" means that the distance between the drive axis and the pin axis is less than the diameter of the pin element.

Even more preferably, the drive axis perfectly intersects the pin axis of both the two pin elements between which the drive member is active. In this case, the deformation takes place exactly along one of the diagonals of the articulated quadrilateral.

Preferably, the articulated quadrilateral is an articulated parallelogram. In fact, usually it is desired that the derailleur be moved in translational motion with respect to the bicycle frame; nevertheless other particular applications are not ruled out.

The motor member with a variable length output shaft can be of various types; for the purposes of the invention, it does not matter how the variation in length along the drive axis is obtained. Preferably, the motor member comprises an electric motor housed on a support mounted on a first of the pin elements, a screw arranged axially along the drive axis and put into rotation by the electric motor, a nut screw engaged with the screw and fixed to a second of the pin elements opposite to the first, wherein the drive axis perfectly intersects the axis of the second pin element. The rotating screw-nut screw solution will be appreciated for its simplicity and for the ease with which it allows the length variations of the drive member to be controlled; indeed, there is direct proportionality between angles of rotation (or better number of turns) and length variation.

Usually, the connecting rods have a substantial width in the direction of the pin axes, defining with such a width an inner space of the articulated quadrilateral; with respect to such an inner space, the drive member can be placed externally (suitably extending the pin elements) or—preferably—internally. The internal positioning indeed determines a lower encumbrance on the actuator and a more balanced and therefore more precise actuation of the drive member.

To allow the aforementioned internal positioning of the drive member together with the perfect intersection of the drive axis with the axes of the pin elements, preferably the nut screw comprises an internally threaded tubular body, and two opposite pin portions perpendicular to the tubular body. In practice, therefore, the nut screw itself becomes part of the second pin element.

With such a nut screw, preferably, the second pin element moreover comprises two opposite pins, each inserted into hinging holes formed in the connecting rods converging in the second pin element and in the pin portions of the nut screw. This solution allows an easy assembling of the pin element and of the connecting rods.

Preferably, a degree of freedom is provided between the motor and the articulated quadrilateral. This means that slight relative movement between the motor and the articulated quadrilateral is tolerated. This degree of freedom ensures that the action of the motor is transferred to the quadrilateral, without anomalous stresses due to small mechanically acceptable tolerances in the shaping or assembly of the parts.

This tolerance or degree of freedom can be achieved in various ways. According to a preferred way, it is provided by a clearance which allows the nut screw to make small displacements in the direction of the axis of the second pin element. According to another preferred way, it is provided by a Hooke's joint between the screw and the motor. The first solution is clearly cheaper; hoverer, the second solution is certainly more efficient and more expensive.

Preferably, the tubular body of the nut screw is closed at one of its ends and has a length such as to receive the screw during the maximum contraction of the drive member. The closing of the tubular body guarantees the better protection of the threaded coupling between screw and nut screw against dirt and impurities during the use of the bicycle on which the actuator is mounted.

Preferably, the device comprises a mechanical fuse in the coupling between the drive element and the articulated quadrilateral mechanism. As used herein, mechanical fuse means a mechanical element in the kinematical chain interposed between the motor and the articulated quadrilateral which is provided with a predetermined stress resistance that is lower than the resistance of all the other elements. In this way, in the presence of anomalous high-intensity stresses on the actuator (due for example to knocks caused by the bicycle falling down), the mechanical fuse operates or yields and the other elements are protected.

In a preferred embodiment, the mechanical fuse comprises a coupling with a calibrated interference between the electric motor and its support, such as to allow relative axial displacements only when a predetermined holding stress is exceeded. In the case of a knock, the quadrilateral shall be able to freely deform without damages because of the axial withdrawal of the motor from its support.

According to another preferred embodiment, the mechanical fuse comprises a coupling with calibrated interference between a threaded bush engaged with the screw of the motor and a receiving seat thereof in the tubular element of the nut screw, such as to allow relative axial displacements only when a predetermined holding stress is exceeded. In the case of a knock, the quadrilateral shall be able to freely deform without damages because of the axial withdrawal of the bush from the nut screw.

According to a further preferred embodiment, the mechanical fuse comprises a coupling with calibrated interference between the Hooke's joint and at least one of the motor or the threaded screw. In the case of a knock, the quadrilateral shall be able to freely deform without damages because of the axial withdrawal of the Hooke's joint.

With reference to FIGS. 1 to 5 and reference number 10, a bicycle actuator is illustrated. It will be appreciated that neither the gear-shift nor the bicycle is part of the invention and, therefore, are not illustrated.

The actuator device 10 comprises an articulated quadrilateral mechanism 11 made up of four connecting rods: a first connecting rod 21 intended to be fixed integrally to the bicycle frame, a second connecting rod 22 opposite to the first connecting rod 21 in the articulated quadrilateral support 11 and intended to be fixed to a support for a gear-shift derailleur, a third connecting rod 23 and a fourth connecting rod 24. The four connecting rods 21, 22, 23 and 24 are articulated together according to four parallel pin axes 31, 32, 33 and 34 by four respective pin elements 41, 42, 43 and 44, so as to form the aforementioned support 11.

It should be noted (FIG. 3) that the connecting rods 21, 22, 23 and 24 have a substantial width in the direction of the pin axes 31, 32, 33 and 34; owing to such width, an internal space is defined in the support 11 between the connecting rods 21, 22, 23 and 24 and the pin elements 41, 42, 43 and 44.

Figure 3:
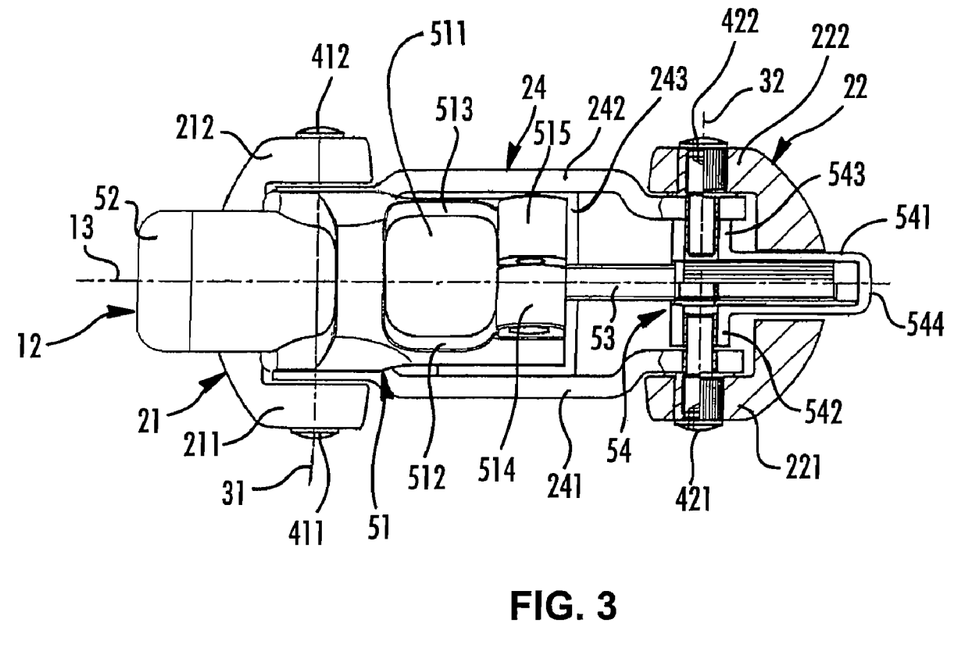
FIG. 3 is a partial section view (and with parts partially removed) of the device of FIGS. 1 and 2 in a further operating position (intermediate between those illustrated in FIGS. 1 and 2), taken in the direction of the arrow III.
Figure 4:
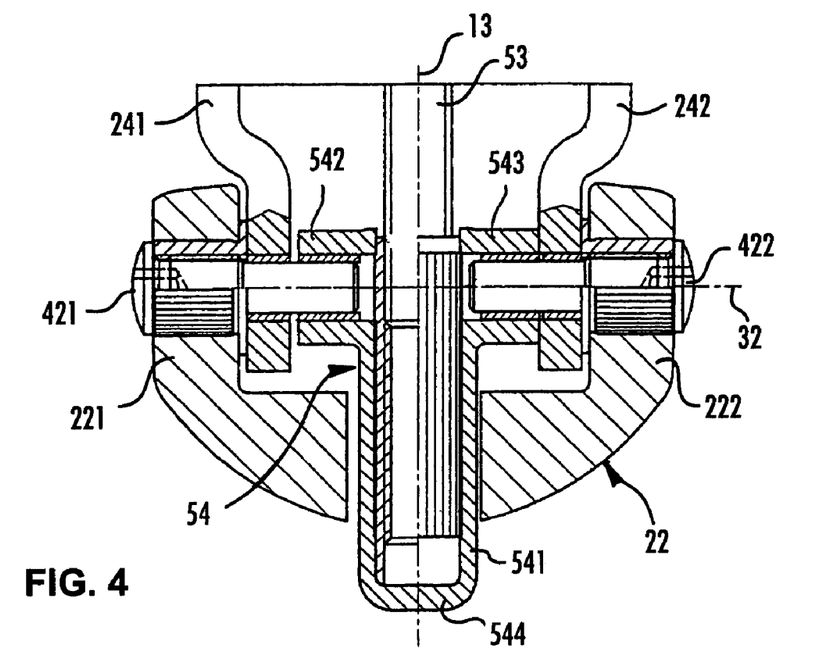
FIG. 4 is an enlarged view of a detail of FIG. 3.
Figure 5:
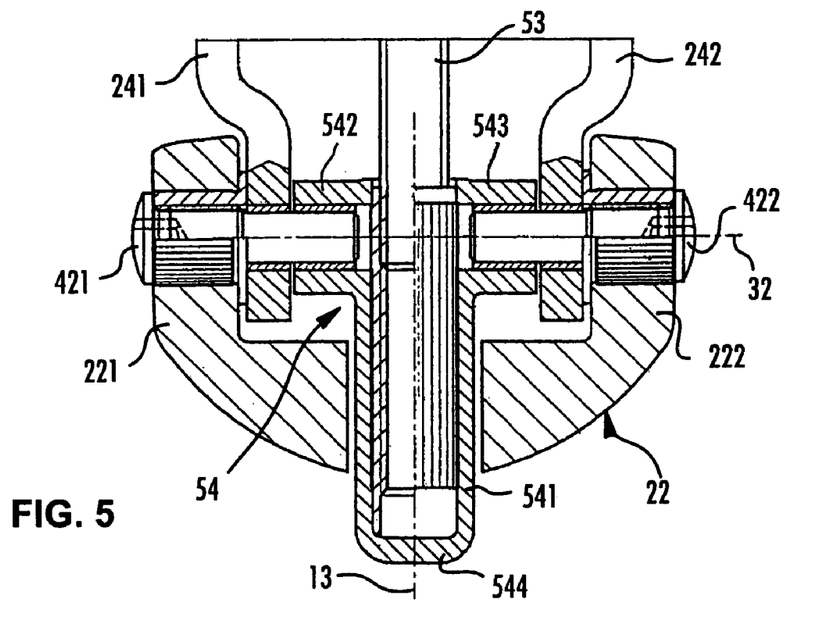
FIG. 5 is a view of the same detail of FIG. 4, in a different operating condition.

It should also be noted that both the connecting rods 21, 22, 23 and 24 and the pin elements 41, 42, 43 and 44 can have any shape, more or less complex. For example, the first connecting rod 21 has a relatively massive configuration, just like the second connecting rod 22; the connecting rod 23, instead, has a substantially plate-shaped configuration, whereas the connecting rod 24 is made up of a monolithic structure with two parallel arms 241 and 242 joined by a bridge 243. Equally, the pin elements 43 and 44 are simple pins, whereas the pin elements 41 and 42 have a more complex structure, as shall be illustrated hereinafter.

As for the sizes, in the illustrated actuator device 10 the distances between the paired pin axes 31 and 33; 32 and 34 are equal, just as the distance between the pin axes 31 and 34 is equal to the distance between the pin axes 32 and 33. This means that the support 11 is more precisely an articulated parallelogram, and the connecting rod 22 moves with translational motion along a circular path, defined by the connecting rods 23 and 24. If the support 11 were not a parallelogram, the motion of the connecting rod 22 would have not only a translational component, but also a rotational component. While this situation is usually not desired, it could be useful in certain conditions, to give particular movements to the gear-shift derailleur.

The drive member 12 has an open-cradle support 51, mounted on the first pin element 41. More precisely, the support 51 is made up of a monolithic structure with two side members 512 and 513, see FIG. 3, connected by a bridge 511; the two side members 512 and 513 have eyelets 514 and 515, facing each other and aligned so as to be able to receive a conventional locking means, such as a bolt (not shown in the figures).

The assembling of the support 51 on the pin element 41 is obtained in the following manner. The connecting rod 21 has two wings 211 and 212, again referring to FIG. 3, which surround the arms 241 and 242 of the connecting rod 24, which in turn surround the side members 512 and 513; the pin element 41 consists of two pins 411 and 412, see FIG. 3, each inserted in holes formed along the axis 31 in the elements 211, 241 and 512 and 212, 242 and 513, respectively.

The drive member 12 includes an electric motor 52, housed and fixed in the support 51. The motor 52 is provided with drive shaft 52a made up of a screw 53, engaged with a nut screw 54, mounted on the second pin element 42, see FIGS. 1 and 2, opposite to the first pin element 41 in the support 11. The rotation of the screw 53 determines the movement of the nut screw 54 on the screw 53 and consequently the variation in length of the drive member 12. This variation in length of the drive member 12 in turn determines a corresponding deformation of the support 11.

Figure 1:
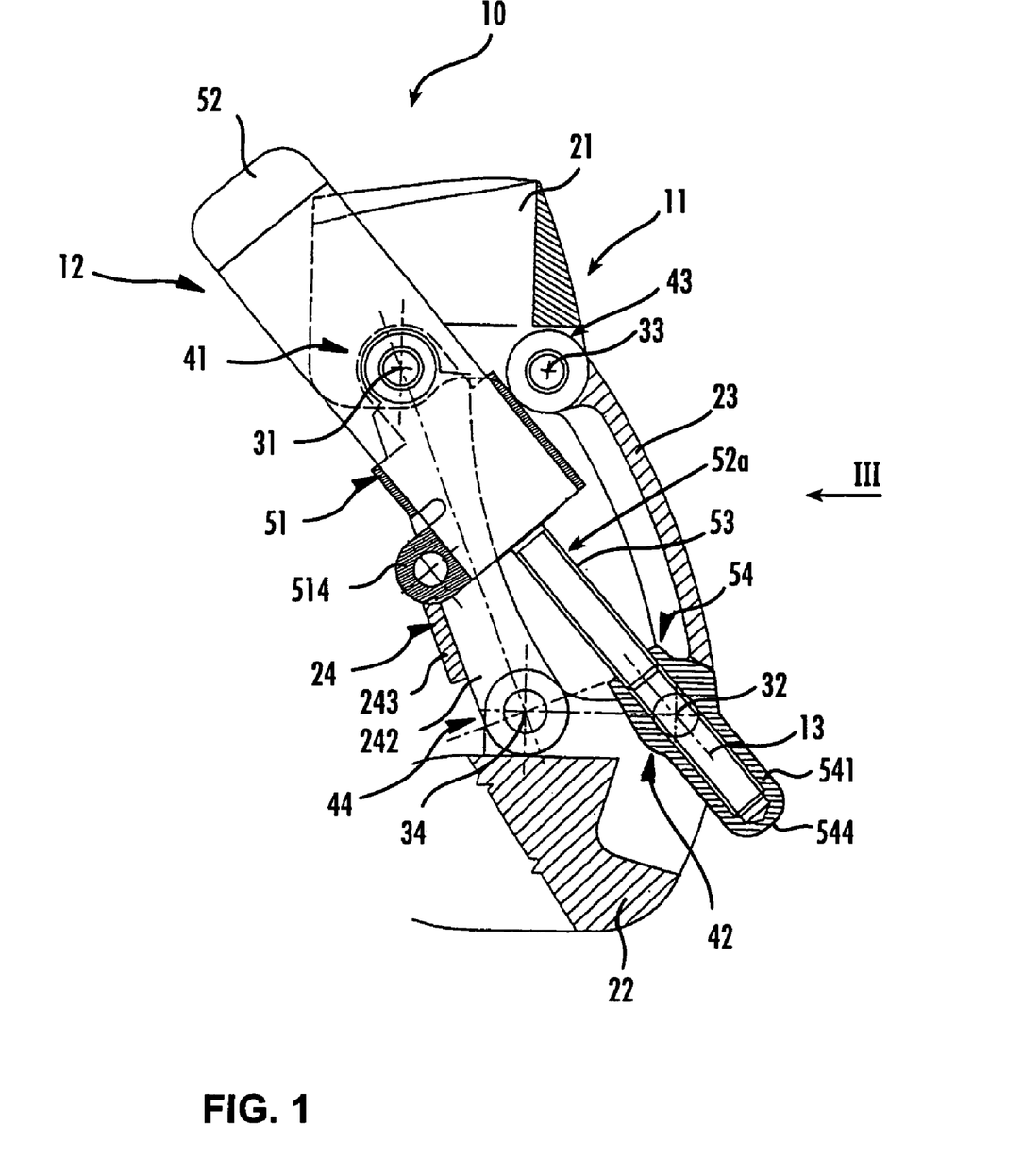
FIGS. 1 and 2 are partial section views of an actuator device according to a first embodiment of the invention, in two different operating positions.
Figure 2:
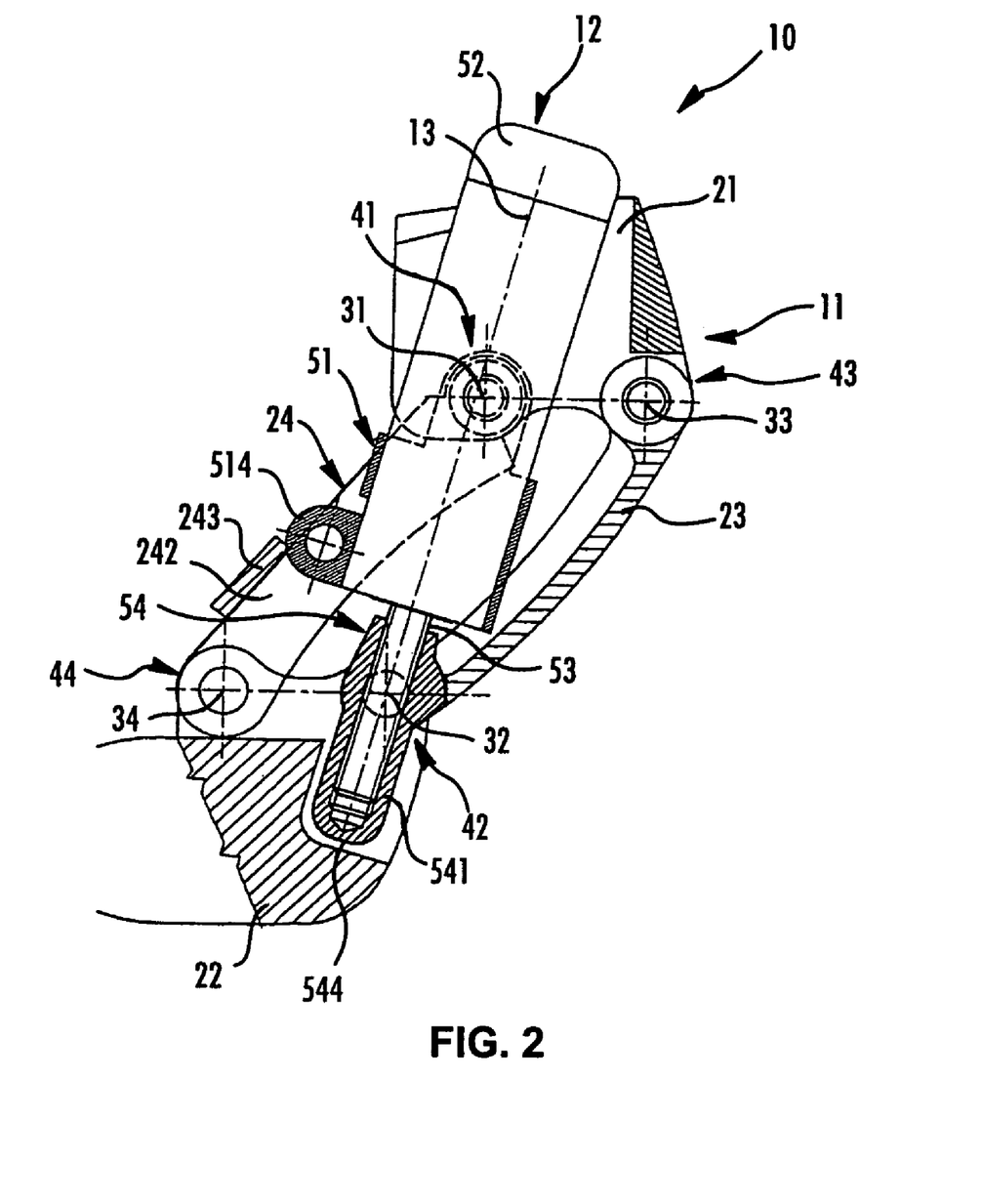

The nut screw 54 comprises a tubular body 541, see FIGS. 1-3, threaded internally and engaged with the screw 53, and two pin portions 542 and 543, opposite each other and perpendicular to the tubular body 541. The tubular body 541 is closed at its end 544 and extends along the axes 13 such as to be able to receive the whole screw 53 when the drive member 12 is in its maximum contraction condition (FIG. 2).

The assembling of the nut screw 54 in the support 11 is obtained in the following manner. The connecting rod 22 has two wings 221 and 222, see FIG. 3, which surround the arms 241 and 242 of the connecting rod 24, which in turn surround the two pin portions 542 and 543 of the nut screw 54; the pin element 42 consists of two pins 421 and 422, each inserted in holes formed along the axis 32 in the elements 221, 241 and 542 and 222, 242 and 543, respectively.

In accordance with the invention, the drive axis 13 substantially intersects the pin axis 31 and the pin axis 32. In a preferred solution, the drive axis 13 perfectly intersects the pin axis 31 or the pin axis 32 or both.

Figure 9:
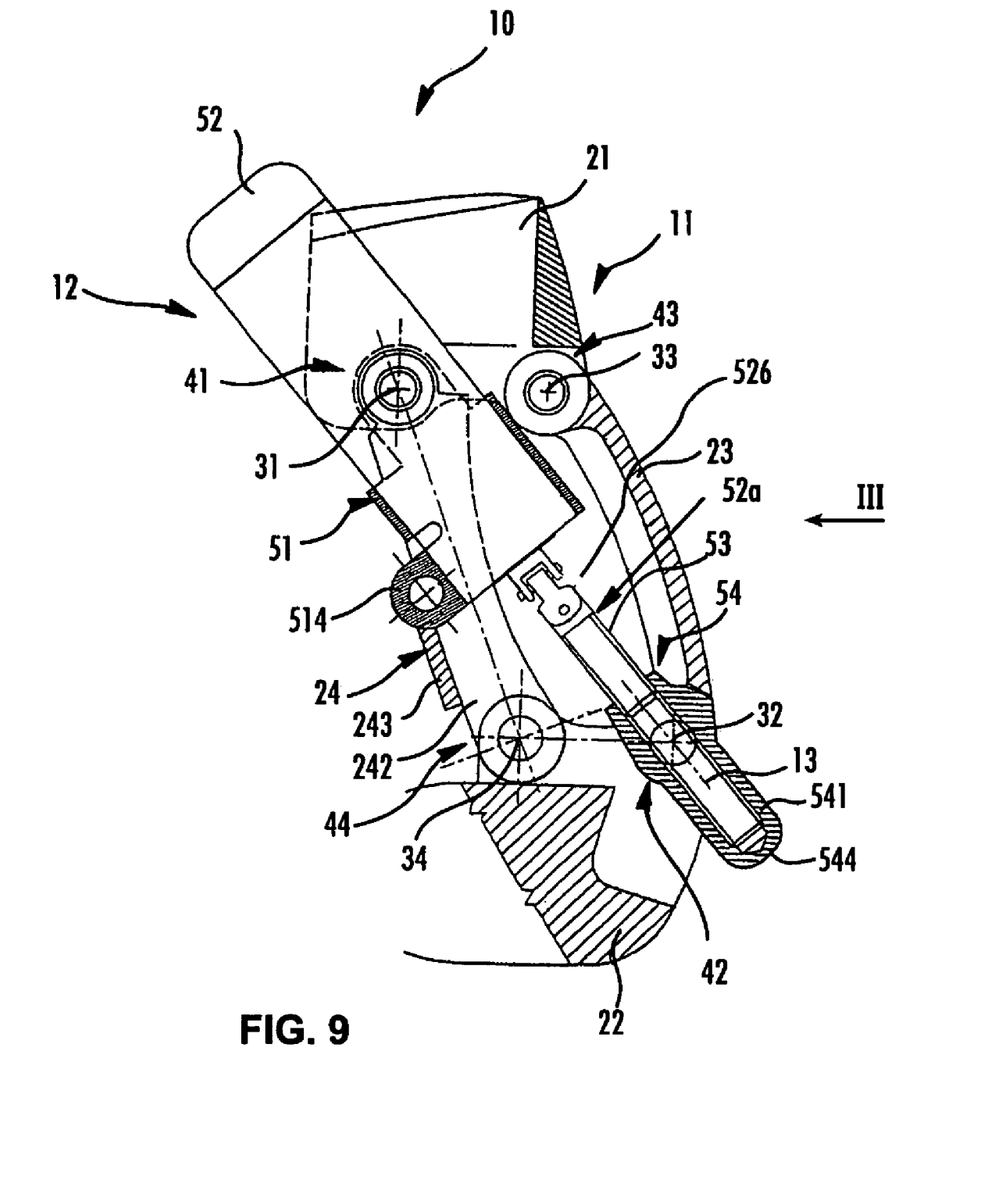
FIG. 9 is a partial section view of an actuator device according to an alternative embodiment of the invention of FIG. 1.

In the coupling between the drive member 12 and the support 11 a degree of tolerance or freedom is provided, that is limited relative movement is allowed between the drive member 12 and the support 11. In the example of FIGS. 1-5 such a degree of freedom is obtained by leaving a small clearance between the nut screw 54 (more precisely its two pin portions 542 and 543) and the wings 241 and 242 of the connecting rod 24, so that the nut screw 54 can move in the direction of the axis 32. This clearance can be better seen in the enlarged FIGS. 4 and 5, which show two different positions of the nut screw 54, possible due to the aforementioned clearance. In an alternative version shown in FIG. 9, the degree of freedom can be provided foreseeing that the screw 53 be distinct from the drive shaft 52a and connected to it through a Hooke's joint 52b. In any case, the aforementioned degree of freedom prevents small misalignments between the parts from causing harmful mechanical stresses, which are potential sources of malfunctions or even breakdown. Thus, normal manufacturing tolerances can be established to take into account the provision of the desired degree of freedom.

Figure 6:
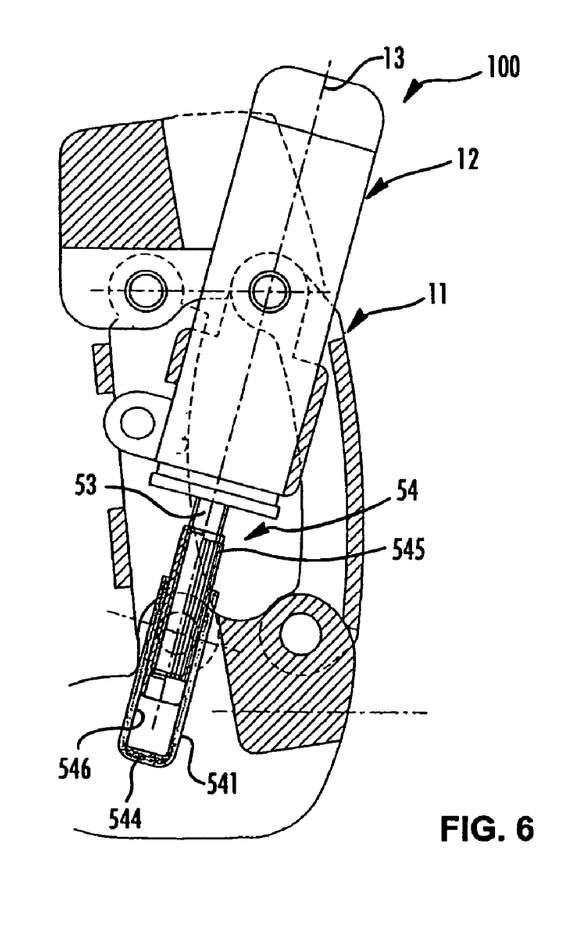
FIGS. 6 and 7 are partial section views of an actuator device according to a second embodiment of the invention, in two different operating positions.
Figure 7:
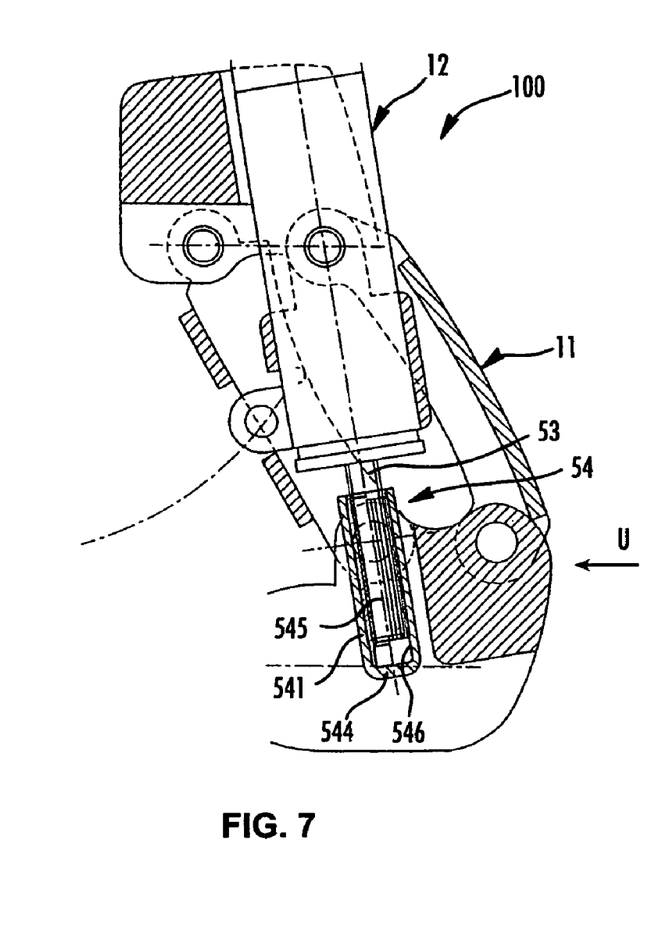
Figure 8:
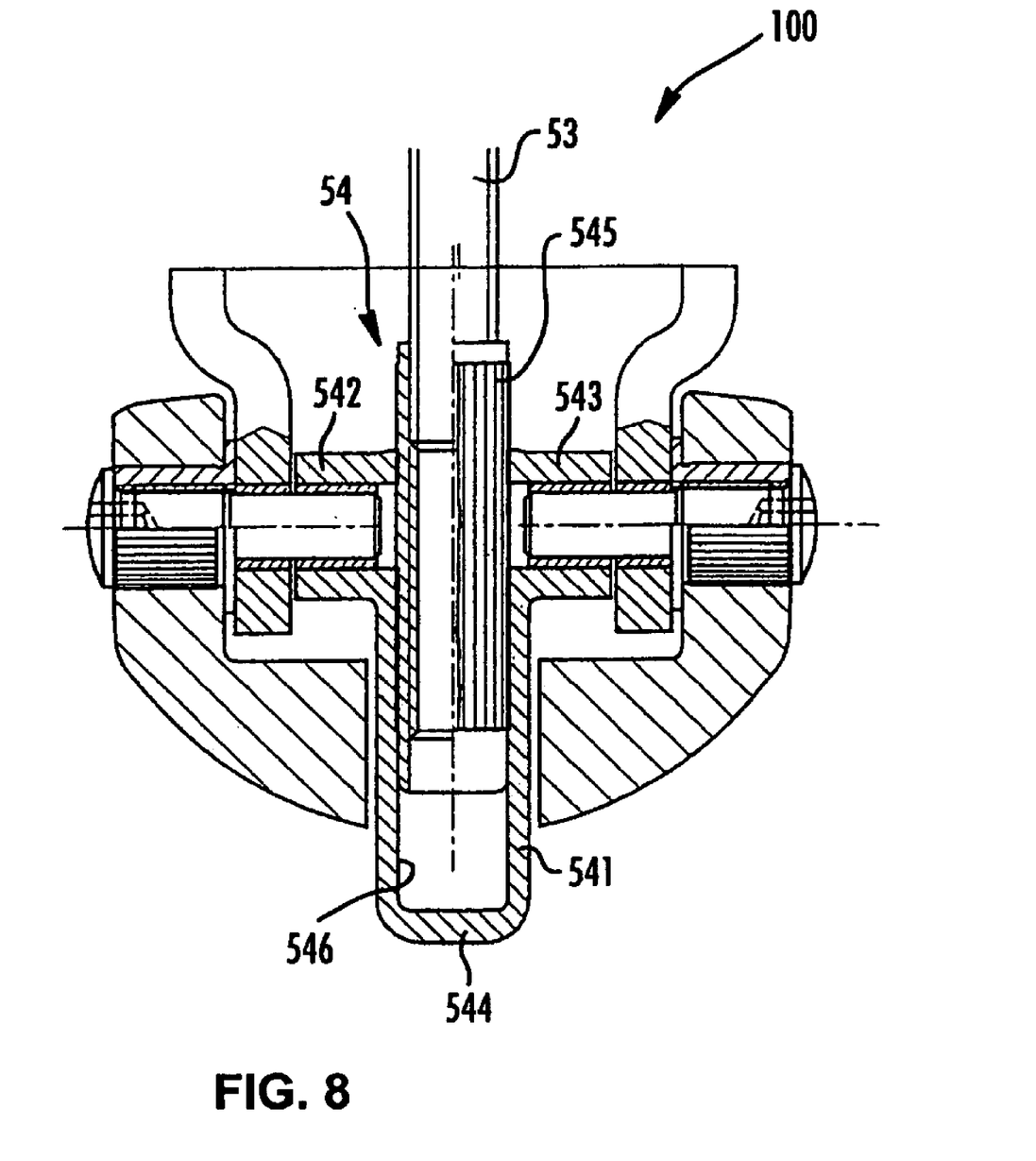
FIG. 8 is an enlarged partial section view of a detail of the device of FIGS. 6 and 7, taken in the direction of the arrow VIII.

FIGS. 6-8 show another actuator 100, similar to the actuator 10 of FIGS. 1-5, but including a mechanical fuse. For the sake of simplicity, there will be described only the parts of the actuator 100 which are different or additional with respect to the actuator 10; parts and elements of the actuator 100 that correspond to parts and elements of the actuator 10 are indicated with the same reference numbers used earlier.

The tubular body 541 of the nut screw 54 is not internally threaded, but rather it is provided with a tubular bushing 545, which is internally threaded and is engaged with the screw 53 of the motor 52. The bushing 545 is pressed or forcefully inserted into an axial receiving seat 546 formed in the tubular body 541; the outer dimension of the bushing 545 and the inner dimension of the seat 546 are carefully chosen so that the force with which the bush 545 can be removed from the seat 546 has a predetermined value. The assembly pressure will be selected so as to correspond to the maximum application stresses. Thus, an off road competition actuator may have a greater assembly pressure than an on road casual bicycle. To prevent rotation of the bush 545 in the seat 546, it is possible to provide at least one of the contact surfaces with axial scoring as is shown in FIG. 8.

FIGS. 6 and 7 show how, in the case of a knock according to the arrow U (typical knock in the case of a bicycle falling, with the actuator device 100 mounted on it,), the bushing 545 withdraws from the seat 546, thus absorbing the knock and in such a way protecting the motor 52 and the other elements of the actuator. The aforementioned coupling with calibrated interference between the bush 545 and the seat 546 thus constitutes the mechanical fuse. It should be noted that the correct operating condition can easily be reset by moving the bushing 545 back into the seat 546.

In an alternative solution, the mechanical fuse can consist of a coupling with calibrated interference between the motor 52 and its support 51. This solution does not require an additional piece (such as the bushing 545 of the solution above illustrated), but on the other hand it requires control of the constructive tolerance for the outer size of the motor 52, which usually is not necessary.

Another alternative solution, in the case in which the degree of freedom is obtained through a Hooke's joint, is that of providing a coupling with calibrated interference on such a joint, on the side of the drive shaft 52a or of the screw 53.

The invention claimed is:
1. Actuator device for a bicycle gear-shift, comprising:
an articulated quadrilateral with four connecting rods hinged together according to four pin axes by four pin elements, in which the first connecting rod is intended to be integrally fixed to the bicycle frame, the second connecting rod is opposite to the first connecting rod in the articulated quadrilateral and is intended to be fixed to a support for a gear-shift derailleur, in which the connecting rods have a substantial width in the direction of the pin axes, with such a width defining an internal space in the articulated quadrilateral, wherein the motor member is arranged inside such an internal space, in which the second pin element also comprises two opposite pins, each inserted in hinging holes formed in the connecting rods converging in the second pin element and in the pin portions of the nut screw;
a motor member, having a variable length according to a drive axis and active between two opposite pin elements to move them towards and away from each other deforming the articulated quadrilateral, in which the motor member comprises an electric motor housed on a support mounted on a first of the pin elements, a screw arranged axially along the drive axis and put into rotation by the electric motor, a nut screw engaged with the screw and fixed to a second of the pin elements opposite the first, wherein the drive axis perfectly intersects the axis of the second pin element, in which the nut screw comprises two pin portions opposite each other and perpendicular to the nut screw;
wherein the drive axis substantially intersects the pin axis of both the two pin elements between which the motor member is active, in which the drive axis perfectly intersects at least one of the pin axes of the two pin elements between which the motor member is active.

2. Device according to claim 1, in which the connecting rods have a substantial extension in the direction of the pin axes, with such an extension defining an internal space of the articulated quadrilateral, wherein the motor member is arranged outside of such an internal space.

3. Device according to claim 1, in which a degree of freedom is provided between the motor and the articulated quadrilateral.

4. Device according to claim 3, in which the degree of freedom is provided by a clearance which allows the nut screw small movements in the direction of the axis of the second pin element.

5. Device according to claim 3, in which the degree of freedom is provided by a Hooke's joint.

6. Device according to claim 1, in which the tubular body of the nut screw is closed at one of its ends and has a length such as to receive the screw during the maximum contraction of the motor member.

7. Device according to claim 1 further comprising a mechanical fuse in a coupling between the motor member and the articulated quadrilateral.

8. Device according to claim 7 in which the mechanical fuse comprises a coupling with calibrated interference between the electric motor and an electric motor support, such as to allow relative axial movements based on predetermined criteria.

9. Device according to claim 7, in which the coupling has calibrated interference between a threaded bush engaged with a screw of the motor and a receiving seat thereof in a tubular element of a nut screw, such as to allow relative axial movements based on predetermined criteria.

10. Device according to claim 7, in which the mechanical fuse comprises a coupling between a Hooke's joint and at least one among the motor member and a threaded screw.

11. Device according to claim 1 in which the drive axis perfectly intersects the pin axis of both of the two pin elements between which the motor member is active.

12. Device according to claim 1 in which the articulated quadrilateral is an articulated parallelogram.

13. A bicycle gear-shift actuator comprising:
an articulated quadrilateral support with four connecting rods hinged together by four pins which define;
a motor member, having a variable length output shaft that traverses along a drive axis extending between two diagonally opposed pins and moves them toward and away from each other to deform the articulated quadrilateral support; and
the drive axis substantially intersects each pin axis of the diagonal pins;
wherein at least one of the two opposed pins comprises two axially coincidental pins, each hingedly connected to the connecting rods.

14. The actuator of claim 13 wherein the drive axis perfectly intersects at least one of the pin axes of the two pin elements between which the motor member is active.

15. The actuator of claim 13 wherein the motor member is arranged inside an internal space defined by the articulated quadrilateral.

16. The actuator of claim 13 further comprising a nut engaged to the output shaft and the axially coincidental pins.

17. The actuator of claim 13 further comprising a tubular bush that is internally threaded and engaged to the output shaft and the axially coincidental pins.

18. Device according to claim 13, in which a degree of freedom is provided between the motor and the articulated quadrilateral.

19. Device according to claim 18, in which the degree of freedom is provided by a clearance which allows the nut screw small movements in the direction of the axis of the second pin element.

20. Device according to claim 18, in which the degree of freedom is provided by a Hooke's joint.

21. Device according to claim 13, in which the tubular body of the nut screw is closed at one of its ends and has a length such as to receive the screw during the maximum contraction of the motor member.

22. Device according to claim 13 further comprising a mechanical fuse in a coupling between the motor member and the articulated quadrilateral.

23. Device according to claim 22 in which the mechanical fuse comprises a coupling with calibrated interference between the electric motor and an electric motor support, such as to allow relative axial movements based on predetermined criteria.

24. Device according to claim 22, in which the coupling has calibrated interference between a threaded bush engaged with a screw of the motor and a receiving seat thereof in a tubular element of a nut screw, such as to allow relative axial movements based on predetermined criteria.

25. Device according to claim 22, in which the mechanical fuse comprises a coupling between a Hooke's joint and at least one among the motor member and a threaded screw.

26. A bicycle gear-shift actuator comprising:
an articulated quadrilateral support with four connecting rods hinged together by four pins which define;
a motor member, having an output shaft that traverses along a drive axis extending along a line between two diagonally opposed pins and moves the pins toward and away from each other to deform the articulated quadrilateral support, the output shaft engaged to a bush rotatably engaged proximate to one of the opposed pins; and
the drive axis substantially intersects each pin axis of the diagonal pins.

27. The actuator of claim 26 further comprising:
an seat that removably receives and engages the bushing.

28. The actuator of claim 27 wherein the engagement between the bushing and the seat is such that a force acting on the quadrilateral support disengages the bushing from the seat.

29. Actuator device for a bicycle gear-shift, comprising:
an articulated quadrilateral with four connecting rods hinged together according to four pin axes by four pin elements, in which the first connecting rod is intended to be integrally fixed to the bicycle frame, the second connecting rod is opposite to the first connecting rod in the articulated quadrilateral and is intended to be fixed to a support for a gear-shift derailleur;
a motor member, having a variable length according to a drive axis and active between two opposite pin elements to move them towards and away from each other deforming the articulated quadrilateral;
wherein the device comprises a mechanical fuse in the coupling between the motor element and the articulated quadrilateral.

30. Device according to claim 29 in which the mechanical fuse comprises a coupling with calibrated interference between the electric motor and an electric motor support, such as to allow relative axial movements based on predetermined criteria.

31. Device according to claim 29, in which the coupling has calibrated interference between a threaded bush engaged with a screw of the motor and a receiving seat thereof in a tubular element of a nut screw, such as to allow relative axial movements based on predetermined criteria.

32. Device according to claim 29, in which the mechanical fuse comprises a coupling between a Hooke's joint and at least one among the motor member and a threaded screw.

* * * * *

UNITED STATES PATENT AND TRADEMARK OFFICE
CERTIFICATE OF CORRECTION

| | | |
|---|---|---|
| PATENT NO. | : 7,255,660 B2 | Page 1 of 1 |
| APPLICATION NO. | : 11/416032 | |
| DATED | : August 14, 2007 | |
| INVENTOR(S) | : Dal Pra | |

It is certified that error appears in the above-identified patent and that said Letters Patent is hereby corrected as shown below:

Title page, item (56) under References Cited, please insert --Foreign Application No. EP 02425271.0, Filing date April 26, 2002--.

Title page, item (12), Column 1, Line 2, delete "Del" and insert --Dal--.

Title page, item (56), under "U.S. PATENT DOCUMENTS", in Column 2, Line 7, delete "Del Pra" and insert --Dal Pra--.

Title page, item (75), under "Inventor", in Column 1, Line 1, delete "Del" and insert --Dal--.

In Column 8, Line 43, in Claim 27, delete "an" and insert --a--.

Signed and Sealed this

Sixth Day of November, 2007

JON W. DUDAS
*Director of the United States Patent and Trademark Office*